United States Patent
Badá et al.

(10) Patent No.: US 6,611,565 B1
(45) Date of Patent: Aug. 26, 2003

(54) BROADBAND TRANSMITTER FOR A SIGNAL CONSISTING OF A PLURALITY OF DIGITALLY MODULATED CARRIERS

(75) Inventors: Anna Marina Badá, Milan (IT); Marco Politi, Milan (IT)

(73) Assignee: Siemens Information & Communication Network S.p.A., Milan (IT)

(*) Notice: Subject to any disclaimer, the term of this patent is extended or adjusted under 35 U.S.C. 154(b) by 0 days.

(21) Appl. No.: 09/463,442
(22) PCT Filed: Jul. 24, 1998
(86) PCT No.: PCT/EP98/04967
§ 371 (c)(1), (2), (4) Date: Feb. 25, 2000
(87) PCT Pub. No.: WO99/07093
PCT Pub. Date: Feb. 11, 1999

(30) Foreign Application Priority Data

Jul. 25, 1997 (IT) .......................................... MI97A1802

(51) Int. Cl.$^7$ ............................................... H04L 27/04
(52) U.S. Cl. ..................................... 375/295; 375/267
(58) Field of Search ............................. 375/260, 295, 375/347, 267, 299; 370/208, 335

(56) References Cited

U.S. PATENT DOCUMENTS 5,551,070 A    8/1996   Skarby et al.
5,579,341 A    11/1996  Smith et al.
6,128,276 A  * 10/2000  Agee ........................... 370/208

FOREIGN PATENT DOCUMENTS

EP    B1534255    3/1993

* cited by examiner

Primary Examiner—Don N. Vo
(74) Attorney, Agent, or Firm—Birch, Stewart, Kolasch & Birch, LLP

(57) ABSTRACT

It is described a broadband radio transmitter for a digital signal consisting of a plurality of not necessarily equispaced, digitally modulated carriers. The transmitter selects the second replica of the spectrum of the signal coming out from a digital-to-analogue converter DAC to increase the space of the useful signal from the continuous in comparison of the direct use of the base band spectrum would involve. The object of the invention is in fact to obtain a wider transition band and consequently a less stringent local oscillator residue and image filter at radio frequency. To eliminate or reduce the effect of the $\sin(\pi fT)/(\pi fT)$ function that envelopes the signal coming out from the DAC, the invention foresees the use of an equalization of the analogue type, or the adoption of a zero insertion technique (of the digital or analogue type) or in general a digital x/sin x equalizer. The broadband signal is converted at radio frequency and the image filter selects the lower side band to cancel the spectral inversion made by the DAC if an even order replica is used. The transmitter can be profitably employed in any broadband transmitter application and in any mobile system GSM 900 MHz, or DCS 1800 MHz or UMTS.

14 Claims, 6 Drawing Sheets

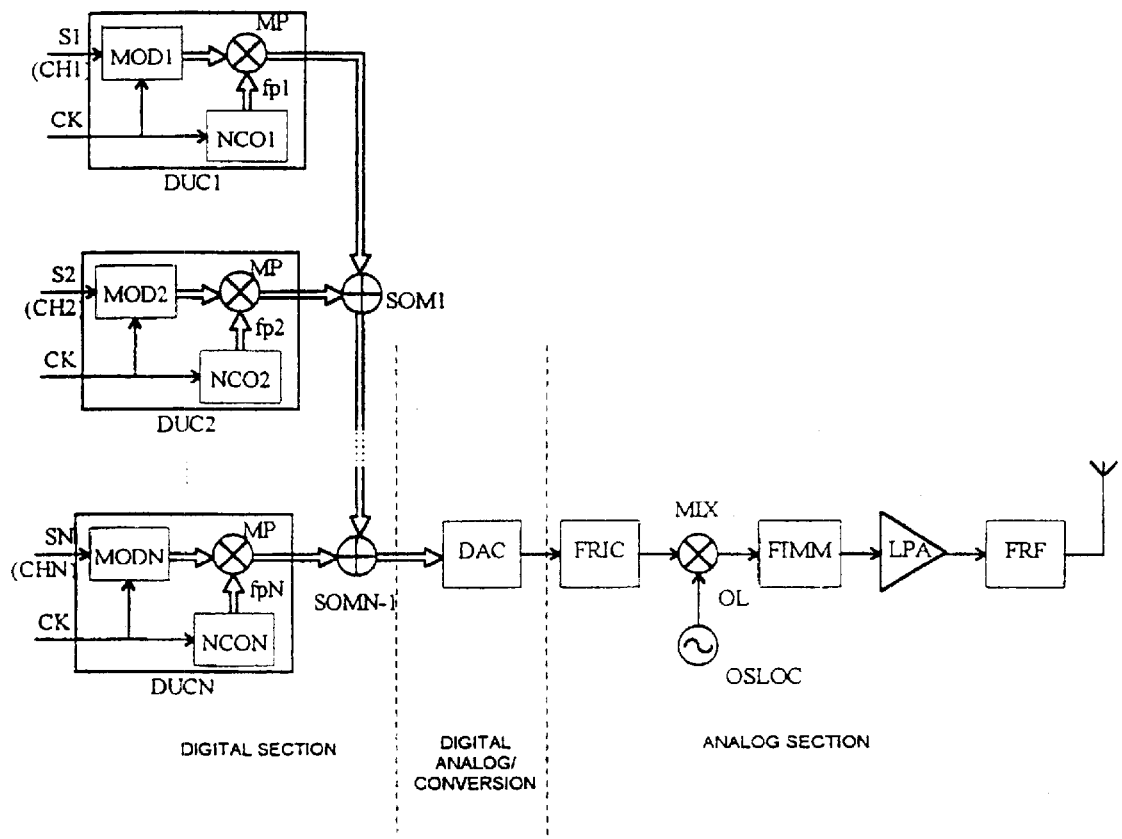
FIG. 8
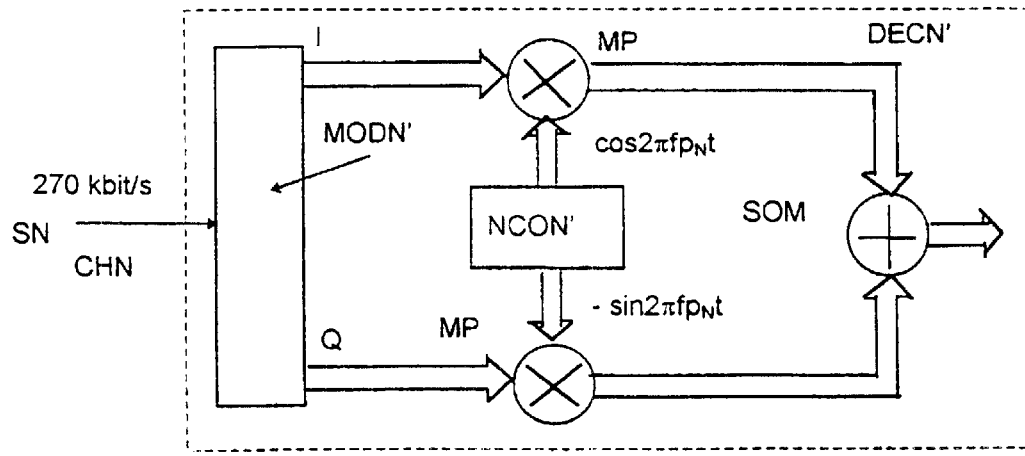
FIG. 8.a

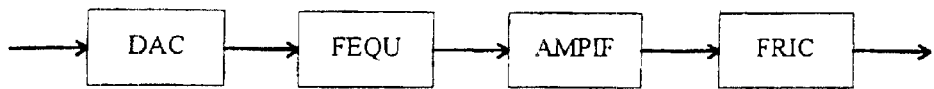
FIG. 8.b
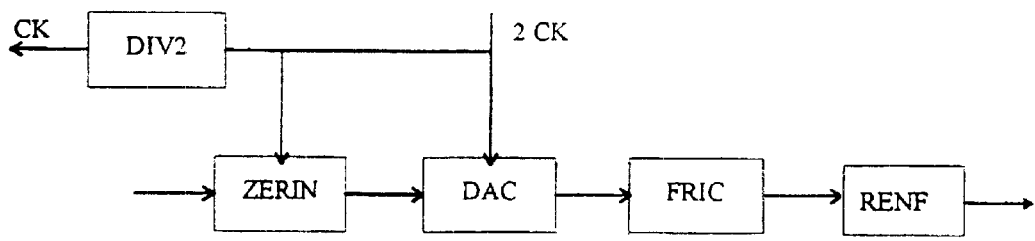
FIG. 8.c
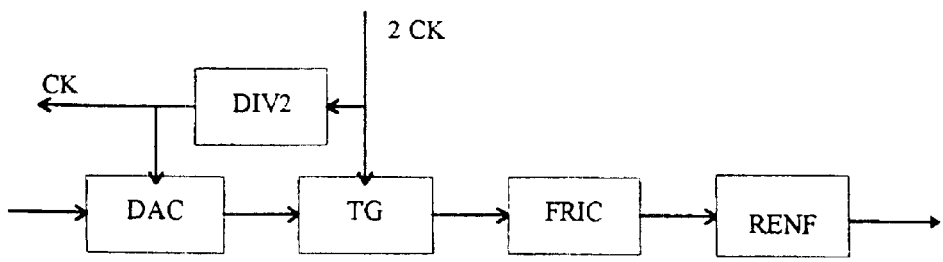
FIG. 8.d

BROADBAND TRANSMITTER FOR A SIGNAL CONSISTING OF A PLURALITY OF DIGITALLY MODULATED CARRIERS

This application is the national phase under 35 U.S.C. §371 of PCT International Application No. PCT/EP98/04967 which has an International filing date of Jul. 24, 1998, which designated the United States of America.

FIELD OF THE INVENTION

The present invention relates to the technique field concerning professional telecommunication systems, and more particularly a broad band transmitter for a signal consisting of a plurality of digitally modulated carriers.

The use of the radio frequency spectrum in telecommunications is governed by international standards which assign specific frequency bands to given services, both public and private. Inside these bands, services are generally organized in order to take advantage of the band occupation to the best extent, for instance, dividing the same into a plurality of contiguous channels. We have number of examples on this matter. A first example is represented by telephone radio links, where thousands of telephonic channels are multiplexed among them, in frequency or in time, and the multiplexed signals are used to modulate the relevant carriers of a same number of radio channels, arranged in order to result contiguous within a microwave band. A second example is given by the Pan-European communication system, hereinafter defined with the acronym GSM (Global System Mobile), based on the time share use of as much as 124 carriers, 200 KHz spaced among them, digitally modulated according to a GMSK scheme (Gaussian Minimum Shift Keying), and individually transmitted within a 35 MHz band (Extended GSM) placed around 900 MHz. The reference to the GSM system is desired since, being the same an essentially digital system, it is the field of preferential application of the transmitter according to the subject invention. As it is already known, by digital modulation we mean a modulation scheme where the parameter, or the parameters, characterising the modulated carriers assume only a discrete number of values; in the GSM, like in the most advanced telecommunication systems, the carriers are orthogonally phase modulated starting from a modulating signal consisting of bursts of information bits.

TECHNICAL PROBLEM

In any type of transmitter for digital signals, in addition to the usual filtering of the image band generated by the radio frequency converter and of the residual of local oscillator, it is necessary first to filter the replicas of the base band spectrum caused by the conversion of the digital signal to the analogue form, the sole possible for radio transmission. FIGS. 1 and 2 show what described above. In particular, in FIG. 1 we can notice that the sampling frequency fs is higher than the double of the useful band BW of the signal to sample, as defined by the Nyquist criterion to avoid spectral superimposition in the sampled signal.

In the case a multicarrier transmitter is implemented, according to the architecture that can be assumed, the above filtering can result more or less expensive. In fact, if one wants to construct a multicarrier signal of the digital type, it should be useful to sum up in a digital way the largest possible number of modulated carriers in order to avail of the speed allowed by the digital section performing such construction to the maximum extent, compatibly with the maximum operation speed of the digital-to-analogue converter. However, this operation method would involve a considerable shortening of the distances existing between the lower edge of the base band and the continuous, on one side, and the upper edge and the fs/2 frequency, on the other side. The above mentioned distances are indicated with $\Delta F$ in FIG. 3 and have the following expression in case of simmetric allocation of BW in the Nyquist band:

$$\Delta F = \frac{\left(\frac{f_s}{2} - BW\right)}{2}. \tag{1}$$

The approaching of the useful spectrum to the continuous would complicate the radio frequency filtering to eliminate the residue of local oscillator and the image band (see FIG. 2), while the approaching to fs/2 would complicate the reconstruction filtering for the elimination of undesired spectral replicas (see FIG. 1). There is therefore a compromise between the choice of the sampling frequency fs and the bandwidth of the multicarrier signal in the first Nyquist area. Concerning the sampling frequency, it corresponds to that of a clock signal used by the digital section. Said frequency shall necessarily be higher than that resulting from the choice of two samples to represent the modulated numeric phase carrier placed at the upper edge of the broad band spectrum, since it is necessary to maintain said filtration margins. The maximum value of the sampling frequency should be at present 40 MHz approximately, limit imposed by the technology of the marketable components, while concerning the maximum band width of the useful signal, this would depend on the margin one wants to leave to simplify the above mentioned filtering. At 40 MHz frequency no limit would be imposed by the digital/analogue converter, which can easily reach a speed more than double.

It is now assumed the project of a broad band transmitter for a digital multicarrier signal, to the purpose of highlighting the difficulties encountered in a similar implementation, difficulties that up to now have discouraged this type of realization approach. In the postulated transmitter we assume:

sampling frequency 34.6 MHz;
number of channels 16;
a spacing between channels 600 kHz, corresponding to a GSM cluster size equal to 3.

With these assumptions it results that the band of the useful signal BW occupies 10 MHz approx., to be allocated in a first Nyquist area, 17.3 MHz wide. Considering to position the intermediate frequency IF at the centre of the first Nyquist area, that is: IF=8.65 MHz, we obtain that the distances $\Delta F$ between the edges of the useful spectrum and the edges of the first Nyquist area have a value of 3.65 MHz; the margins destined to filtering are therefore very narrow.

FIG. 4 shows the GSM 11.21 specifications relevant to the emission of spurious signals (for systems operating in the GSM band). They foresee that each spurious signal emitted by the transmitter lays under −36 dBm in the whole frequency spectrum up to 1 GHz, except for the reception band, where it is necessary to observe −98 dBm. For frequencies higher than one GHz the specifications impose to emit no more than −30 dBm, except for the bands destined to the 1800 MHz DCS service (Digital Cellular System).

Assuming to employ a local oscillator power $P_{ol}$ equal to 10 dBm, to have an isolation between the local oscillator and the radio frequency in the balanced mixer that generates the frequency convertion of $ISO_{ol\_rf}$=30 dB, and that the gain of the whole transmission chain $G_{tot}$ is 50 dB, we obtain that at the output, without filtering, the residue of local oscillator $Res_{ol}$ is equal to:

$$Res_{ol} = P_{ol} - Iso_{ol} + G_{tot} = 10 - 30 + 50 = 30 \text{ dBm}. \quad (2)$$

In the case the residue of local oscillator falls in transmission band, it is necessary to increase the 30 dBm to −36 dBm, that is, a radio frequency band pass filter must be employed, which at a distance ΔF=3.65 MHz from the edges of the band attenuates 66 dB. To obtain this, it is necessary to use two identical Chebyshev filters with 6 resonators; a similar filtering results very expensive.

In addition to the disadvantage of an expensive radio frequency filtering, the use of a low IF could involve a second disadvantage represented by the fact that conversion products generated by the non linearity of the mixer could fall in the useful band of the signal. The mixer in fact, besides generating undesired signals at the frequencies:

$$f_{OL} \pm f_{can} \quad (3)$$

produces spurious signals at frequencies:

$$N \cdot f_{OL} \pm M \cdot f_{can} \quad (4)$$

for all the combinations of M and N integer positive and negative. The width of the spurious signals decrease as M and N increase. Out of these spurious products, those, which can highly disturb the radio frequency signal, are those of lower rank, because they have higher width and, as we will see now, they can fall in the useful band.

Let's consider the case N=1 and M=2, that is $$f_{IMD1.2} = f_{OL} \pm 2 f_{can} \quad (5)$$

FIG. 5 shows the radio frequency spectrum situation for the upper side band only, in case of spectrum consisting of only two frequency channels $f_{can1}$ and $f_{can2}$, one at the beginning and the other one at the end of the useful spectrum BW:

$$BW = f_{can2} - f_{can1} \quad (6)$$

It can be easily checked that if the following condition is true:

$$f_{can1} < BW \quad (7)$$

the product due to the non-linearity of the second rank (IMD2) of the mixer falls in the band of the signal to transmit. From the measurements made on some samples we notice that even using double balanced mixers we always have a second order contribution of −50 dBc at least, which when amplified does no more fall under the specifications of FIG. 4 and in any case does not comply with the specifications concerning intermodulations in transmission band, therefore it is necessary to avoid that said contribution can fall in the band of the signal to be transmitted.

In the 16-carrier transmitter of the case considered, the useful spectrum occupies the frequency band between 3.65 MHz and 13.65 MHz, and BW=10 MHz, from which:

$$f_{can1}(3.65 \text{ MHz}) < BW(10 \text{ MHz}),$$

and the condition (7) results therefore checked, consequently the spurious products irremediably fall in the band to be transmitted. A method to avoid that this happens could be that to employ a higher intermediate frequency IF, that can be obtained with a higher clock frequency for the digital section constructing the multicarrier signal. Operating in this way, at equal BW band, we can obtain a higher distance ΔF of the useful spectrum BW from the continuous, until the condition (7) is no more checked, but the contrary condition results inspected:

$$\Delta F = f_{can1} > 10 \text{ MHz}. \quad (8)$$

Unfortunately, the present technological limits of the components employed do not allow such a solution.

The disadvantages described above have until now discouraged the implementation of a digital transmitter of the postulated type. In fact, in the BTS (Base Station Transceiver) of the major manufacturers of mobile systems, where such a transmitter could be profitably employed, what is actually used is a multicarrier transmitter consisting of a plurality of independent mono-channel transmitters, coupled to a unique or to a limited number of antenna. In this way, since a digital section of the type of the postulated transmitter is not present, also the relevant clock problems disappear, as well as those concerning the filtering of the analogue-converted signal replicas, being the transmitters of the narrow band type. It is also used a second intermediate frequency to further simplify the radio frequency filtering.

BACKGROUND ART

FIG. 6 shows a multicarrier transmitter actually employed in a base transceiver station, or BTS, of a mobile communication system GSM. For convenience, only two out of the N identical mono channel equipped transmitters are shown, identified $RFTX_1$ and $RFTX_N$, respectively. The input of the transmitters RFTX1, . . . , RFTXN is reached by relevant bit strings at 270 Kbit/s that convey the transmission burst relating to a same number of communication channels $CH_1$, . . . , $CH_N$ assigned to the users in conversation. These signals inside the relevant transmitter reach a modulator MOD operating the GMSK modulation of a sinusoidal carrier at 200 KHz in digital form, giving at output a digital signal reaching the input of a digital/analogue converter DAC. The sampler of the DAC is controlled by a CK signal having a value such for which the signal spectrum (PAM) coming out from the DAC has side bands around a first intermediate frequency IF1. The converted signal is filtered by a first band pass reconstruction filter FPB1 that selects the desired band 200 KHz wide. The signal coming out from FPB1 is then sent to an input of a first balanced mixer MIX, reached also by a first local oscillator signal $OL1_1$ at a second intermediate frequency. The signal at second intermediate frequency coming out from MIX1 is filtered again by a second band pass filter FPB2, which selects the desired side band. The signal coming out from FPB2 is then sent to an input of s second balanced mixer MIX2 reached also by a second local oscillator signal, $OL2_1$, . . . , $OL2_N$ respectively, relating to transmitters 1, . . . , N, for the radio frequency conversion. The signals $OL2_1$, . . . , $OL2_N$ differ among them in frequency and are generated by a same number of PLL. In each transmitter the signal coming out from MIX2 is filtered by a relevant image filter FIM1 that eliminates the image band and the local oscillator residue from the radio frequency spectrum, and then sent to a radio frequency power amplifier LPA operating in class A. Amplified signals are newly filtered by relevant channel filters FCH1, . . . , FCHN, having high Q, at whose output a same number of radio frequency signals are present RF1, . . . , RFN, that shall be transmitted. In cascade to the N transmitters, a block RFCOMB at N inputs is placed for the signals RF1, . . . , RFN, that couples the signals present at its inputs to a reduced number of directive antennas $ANT_1$, ANT$_2$ and ANT$_3$, assuming a "corner excited" configuration, obtaining by this a transmission multicarrier signal of the TDMA type.

The chain of blocks forming the RFTX$_1$, ..., RFTX$_N$ transmitters is subdivided into contiguous sections identified with BB, IF1, IF2 and RF to distinguish the operation, in base band, at the first intermediate frequency IF1, at the second intermediate frequency IF2, and at radio frequency RF, respectively.

FIG. 7 shows the operations accomplished on the frequency spectrum by the blocks belonging to sections BB, IF1, IF2 and RF of the transmitters of FIG. 6. In (A) it is shown the band of the signal at intermediate frequency IF1 coming out from the filter FPB1, without the replicas generated by the DAC converter; in (B) the band of the signal shifted to IF2 coming out from the filter FPB2; and finally in (C) the RF signals coming out from the image filters FIM1, ..., FIMN, without the image band. The correct positioning of channels CH1, ..., CHN in the spectrum of the GSM band is due to the different shift in frequency made by the mixers MIX2, controlled by different frequencies for different channels, together with the combination to RF made by the multiple coupler RFCOMB.

As it can be noticed in (C), thanks to the double frequency conversion, both the residue of local oscillator, and the undesired side band are distant from the signal to transmit and therefore more easy to filter.

The architecture of the transmitters of FIG. 6 corresponds, more or less, to that adopted in the BTS of the major manufacturers of mobile systems, this does not mean that it is without inconveniences. In fact, we can immediately notice the great complexity of the whole, essentially due to the mono-channel architecture, which requires a repetition of all the blocks of the transmitter for each group of the eight channels time-share assigned to a single carrier. Consequently, the same applies to the structure of the radio frequency combiner RFCOMB, which shall have an input port for each carrier used. In addition to the above, there are also the necessary redundancies, which become increasingly expensive as the circuitry complexity increases. Furthermore, due to the conversion to the second intermediate frequency, a mixer is required for each single transmitter, a PLL and a band pass filter in excess, compared to the use of a single intermediate frequency. A similar architecture results too expensive and cumbersome, since the analogue portion is prevailing.

EP 0 534 255 discloses a transceiver system capable of simultaneously servicing multiple digital channels and it includes:

means for generating digital carrier signals;

means for modulating said digital carriers;

means for accumulating the modulated signals;

digital to analog converter (DAC) means common to each of the modulated signals;

means for, altering the frequency of the composite signal to a desired radio frequency band.

According to the above, the equalization process is accomplished in digital form by means of a FIR filter and this constrains the digital part of the system to work at a higher frequency than the DAC.

SUMMARY OF THE INVENTION

Therefore the object of the present invention is to overcome the above mentioned drawbacks and to indicate a process for the implementation of a broad band transmitter for a signal consisting of a plurality of not necessarily equispaced digitally modulated carriers.

To reach said objects the present invention discloses a process for the implementation of a multicarrier digital transmitter, comprising the steps of:

a) digital modulation of one, or more, parameters of single numeric carriers belonging to said multicarrier signal, obtained using data information conveyed by N sequences of transmission bits coming from a predetermined number of communication channels;

b) sum of numeric samples of said numeric carriers modulated as explained in the step a), obtaining a sequence of samples at sampling frequency fs of said multicarrier signal;

c) conversion to the analogue form of the above mentioned sample sequence, said process being characterized by the following additional steps:

d) equalization through an analogue filter of the $$\frac{\sin(\pi fT)}{\pi fT}$$

function that envelops the frequency spectrum of said sequence of analogue samples at the output of the digital to analog converter, being T the clock period of the digital to analog converter and f the independent variable frequency;

e) band pass filtering at intermediate frequency to select an n-th replica of the base band spectrum of said multicarrier signal;

f) radio frequency conversion of said replica selected at intermediate frequency;

g) radio frequency band pass filtering for the selection of a side band of the radio frequency converted signal, to amplify and couple to at least one transmitting antenna.

Another object of the invention is a transmitter implemented according to the above process, as disclosed in claim 10.

According to the above, the gist of the present Invention is in defining a system including:

means for digital modulation of a multicarrier signal;

means for summing the numeric samples of the modulated carriers;

means for the conversion to the analogue form (DAC) of the signal;

means for the equalization, through an analog filter, of the $\sin(\pi fT)/(\pi fT)$ function that envelopes the spectrum of the analogue signal means for band pass filtering at intermediate frequency to select an n-th replica of the base band spectrum of the multicarrier signal;

radio frequency conversion and radio frequency filtering means for the selection of a side band of the radio frequency converted signal.

In the claimed system the analogue filter permits to the digital part of the system to work at lower frequency than the DAC, in addition an analogue filter is easier to implement, more reliable and cheaper than a FIR filter.

In the claimed process and system, the major advantage of the frequency shift due of the selection of an n-th replica, is a shift to an intermediate frequency, the signal is then converted to a radio frequency by a mixer.

Another benefit introduced by the analogue equalization is that it can be accomplished through the resetting (TG) of the sampled converted to analogue, this permits to choose the duration of the rectangular sample in a sample interval. So doing it is possible to choose where to put the null of the $\sin(\pi fT)/(\pi fT)$ function that envelopes the spectrum of the analogue signal in respect of the desired replica of the signal. Therefore it is possible to choose what course of the $\sin(\pi fT)/(\pi fT)$ function interests the desired replica. This is no possible to accomplish in digital form because it is possible to put only a finite number of zero samples between two samples of the digital signal, so the null of the $\sin(\pi fT)/(\pi fT)$ function is always placed corresponding to integer multiples of the sampling frequency.

Therefore, the substantial difference between the systems disclosed in EP 534 255 and the claimed process and system is the analogue equalization of the claimed system that is capable to recuperate the $\sin(\pi fT)/(\pi fT)$ function that envelopes the spectrum of the analogue signal.

The great advantage of such a transmitter lies in its simple architecture, completely assigning to a digital section the construction of a multicarrier digital signal, of the TDMA type, obtained summing up different digitally modulated carriers. Said section employs to the purpose a clock signal whose frequency is necessarily higher than that resulting from the choice of two samples to represent the modulated numeric phase carrier placed at the upper end of the broad band spectrum, since it is necessary to maintain the above mentioned filtering margins.

The invention solves all the technical problems highlighted, inevitably involved in a similar architecture, including radio frequency filtering ones, which would otherwise arise from the lack of a second intermediate frequency. To this purpose, it is converted at radio frequency an n-th spectral replica of the multicarrier signal converted to analogue, preferably the second one. This enables a more unconstrained radio frequency filtering and enables to avoid that spurious conversion products of the upper rank fall into the useful band of the transmission signal (thing that would render practically impossible the realization of RF filters). Since the spectrum of the signal coming out from the DAC is enveloped by a function of the $\sin(\pi fT)/(\pi fT)$ type, the choice of an n-th spectral replica involves the fact to introduce a width equalization in the course of the same.

The equalization can be made for instance after the conversion to analogue through a block having transfer function with course of the $(\pi fT)/\sin(\pi fT)$ type, in the frequency area where one wants to drawn the signal followed by an amplifier block that has the purpose to recover the attenuation introduced by the previous equalizer block.

With continued reference to the invention, the equalization can be alternatively made through a simple interpolation (zero insertion) of the multicarrier digital signal before the D/A conversion or after the conversion to analogue.

In this context, the periodical repetitions of the base band spectrum are defined "replicas": the base band spectrum is therefore indicated by the term "first replica", its repetition included between fs/2 and fs is identified "second replica", and so on. The n-th replicas characterized by even n have the peculiarity to be specular versus the base band spectrum (see FIG. 1). If, as it occurs in a preferred use, the replica to be converted at radio frequency is the second one, it is necessary to select, at radio frequency, the lower side band towards the local oscillator frequency, since in this way the second inversion of the spectrum operated by the mixer is used to restore the same in the condition of the base band spectrum. Advantage is taken also from the fact that, thus making, the non desired side band, generated by the mixer, never falls in the spectrum destined to the GSM reception, where the specifications are more stringent (see FIG. 4).

A brief description follows of the zero insertion equalization before the conversion to analogue and its variant to analogue.

The zero insertion technique has the purpose to equalize the signal spectrum, reducing to T' the duration of the samples coming out from the DAC with sampling period T=1/fs through an interpolation made on the same (the relation T'=T/n with n=positive integer number applies), at the DAC input or output without distinction. This enables to place the zeroes of the $\sin(\pi fT')/(\pi fT')$ function that envelopes the frequency spectrum at the output of the DAC, at the frequencies 2 nfs=1/T'.

The architecture of the transmitter according to the subject invention is such that the blocks of the transmitter placed downstream the D/A converter are unique for the multichannel complex, contrarily to what occurred in the transmitter of FIG. 6. Also, said blocks do not include a second mixer for the conversion to a second intermediate frequency, with the respective PLL and band pass filter. Great advantages can therefore be obtained from the use of such a transmitter in a base transceiver station (BTS) of a mobile GSM, or DCS system.

Due to what said above, we can decidedly assert that the architecture of the multicarrier transmitter according to the present invention is able to considerably reduce the production costs of the BTS and to improve the repetition capability and reliability, since the possibilities offered by the less expensive digital techniques concerning signal processing are exploited to the maximum extent, saving the analogue as much as possible.

BRIEF DESCRIPTION OF THE DRAWINGS

The many advantages and features of the present invention will be appreciated from the following detailed description of an embodiment of the same with reference to the attached drawings, in which:

FIG. 8 shows a block diagram of a multicarrier transmitter, object of the present invention;

FIG. 8.a shows an embodiment of a DUCN block of FIG. 8;

FIG. 8.b shows an embodiment of the blocks placed downstream the DAC, to realize the equalization through analogue filter and subsequent amplifier;

FIG. 8.c shows an embodiment of the blocks placed upstream and downstream the DAC, to realize the equalization through zero insertion in the digital section;

FIG. 8.d shows an embodiment of the blocks placed downstream the DAC, to realize the equalization through zero insertion in the analogue section;

FIG. 9.b shows the frequency spectrum S(f) of the signal of FIG. 9.a, where the envelope function is highlighted;

FIG. 10.a briefly represents the samples of the signal at the DAC output;

FIG. 10.*b* shows the frequency spectrum of the signal of FIG. 10.*a*, where the envelope function is highlighted.

DETAILED DESCRIPTION

Figure 1:
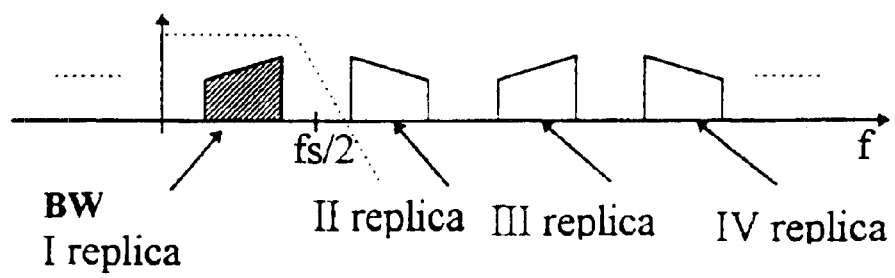
FIGS. 1, 2, 3, 5, 7 and 10 represent the frequency spectrum of the signals concerning the different stages of a digital transmitter, in general.
Figure 2:
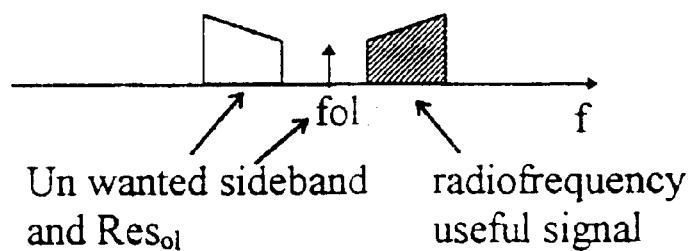
Figure 3:
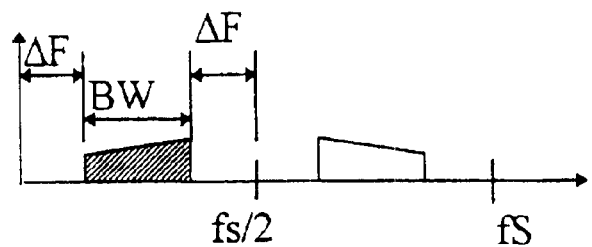

FIG. 8 highlights a multicarrier transmitter at N inputs reached by relevant serial flows of bits s1, s2, . . . , sN that convey the information to transmit relevant to a same number of communication channels CH1, CH2, . . . , CHN. Each bit serial flow reaches the input of a relevant modulator-converter block DUC1, DUC2, . . . , DUCN, all having the same functional architecture. Each one of said blocks includes:

one relevant block MOD1, MOD2, . . . , MODN representing for instance (and this should not be considered as limiting the scope of the invention) of a phase, or width, or width and phase numeric modulator, etc.;

one own numeric oscillator, NCO1, NCO2, . . . , NCON, which generates the samples of a digital sinusoid at frequency, $fp_1$, $fp_2$, . . . , $fp_N$, respectively, availing of a clock signal CK reaching also the modulator blocks, and one own digital multiplier MP receiving at its first input the samples coming out from the relevant modulator and at its second input those of the numeric sinusoid generated by its own oscillator, and generates at output a sequence of samples representing a relevant modulated carrier $fp_1$, $fp_2$, . . . , $fp_N$.

The products coming out from the DUC1 and DUC2 block, reach the inputs of a first adder SOM1, the resulting sum is summed to the product coming out from a subsequent block DUC3 (not visible in the figure), and so on, up to reaching a final adder SOMN-1 to which the product generated by DUCN arrives. The sequence of samples coming put from SOMN-1 at intervals determined by the clock CK represents in digital way the multicarrier signal to transmit.

At the output of the DAC converter an analogue signal s(t) is present, which is filtered by a reconstruction filter of the band pass type FRIC, reaching a first input of a balanced mixer MIX, at the other input of which an OL signal arrives, coming from a local oscillator OSLOC. The radio frequency signal coming out from the mixer crosses an image filter FIMM, reaches a linear power amplifier LPA and is then sent to the antenna.

In FIG. 8 the different stages are divided into three contiguous sections, respectively identified DIGITAL SECTION, DIGITAL TO ANALOGUE CONVERSION SECTION, and ANALOGUE SECTION.

FIG. 8.*a* shows an embodiment of the digital section of the transmitter TXMP that finds application in systems employing digital modulations of the orthogonal type, such as for instance the mobile system GSM 900 MHz, or DCS 1800 MHz. In this case at the input of a generic modulator-converter block DUCN' arrives a sequential flow of bits SN at 270 Kbit/s belonging to the CHN channel, that reaches the input of a quadrature modulator MODN'. This last, through a "mapping" operation, divides the input bits over two ways, identified I and Q, respectively, where flow at symbol frequency, symbols in phase, on the I way, and in quadrature, on the Q way, used to modulate in GMSK two carriers isofrequential between them in phase quadrature. The NCON' block supplies the two digital carriers, $\cos 2\pi fp_N t$ and $-\sin 2\pi fp_N t$, respectively, using for to this purpose the clock CK, which reaches also the MODN' block. The output I of MODN' and the numeric samples of the carrier $\cos 2\pi fp_N t$ reach two separate inputs of a first multiplier MP, while the output Q of MODN' and the numeric samples of the carrier $-\sin 2\pi fp_N t$ reach two separate inputs of a second multiplier MP. The samples coming out from the two multipliers MP reach two relevant inputs of an adder SOM, at the output of which the numeric samples of a GMSK modulated carrier are present.

FIG. 8.*b* shows an embodiment foreseeing to equalize the $\sin(\pi fT)/(\pi fT)$ function that envelopes the widths of the signal coming out from the DAC, through the insertion of an analogue filter FEQU with transfer function of the $(\pi fT)/\sin(\pi fT)$ type in the area of the frequencies interested by the useful signal followed by an amplifier AMPIF having the purpose to recover the attenuation introduced by the filter.

FIG. 8.*c* shows a variant that foresees to make the equalization of the $\sin(\pi fT)/(\pi fT)$ function, enveloping the width of the signal coming out from the DAC through the insertion (upstream the DAC) of digital samples having null value between two adjacent samples of the signal to convert (zero insertion). The clock CK is obtained by a block DIV2 that divides by two the frequency of a clock signal 2CK locally generated.

The sequence of digital samples at the output of the last adder SOMN-1 at intervals defined by the clock CK, reaches a ZERIN block directly controlled by the clock 2CK that insert a digital sample of all zeroes between two subsequent samples of the sequence reaching its own input. The interpolate sequence coming out from the ZERIN block reaches the input of the digital/analogue converter DAC, that is controlled by the clock 2CK too. Now, the signal converted to analogue reaches the reconstruction filter FRIC and proceeds as in the previous step.

FIG. 8.*d* shows a variant of the embodiment of the digital-to-analogue conversion section of the transmitter TXMP, where the numeric samples of the multicarrier signal coming out from the adder SOMN-1 directly reach the DAC converter, controlled by the clock CK. The output of the DAC is connected to a TG device directly controlled by the clock 2CK to nullify the analogue signal coming out from the DAC converter for the whole duration of a half-period of the clock CK (zero insertion in analogue form). The output of the TG device is connected to the input of the reconstruction filter FRIC.

The digital section of the transmitter TXMP can be implemented according to an additional variant, not indicated in the figures, where the samples coming out from the blocks DUC1, DUC2, . . . , DUCN are summed up according to a known strategy as the inverse binary tree. More in particular, the values to be summed up are divided into pairs and the two terms of each pair summed up, the same operation is therefore repeated at subsequent levels up to reaching the adder placed at the top of the tree giving the desired result.

Making reference to FIGS. 8, 8.*a*, 8.*b*, 8.*c*, 8.*d*, 9.*a*, 9.*b*, 10.*a* and 10.*b*, the operation of the transmitter TXMP of the non-restrictive example is now illustrated.

As far as the digital section is concerned, the number of channels simultaneously transmitted, spaced 800 KHz each other, is N=16, as in the transmitter postulated in the introduction. In this way it is more clearly understood how the invention allows the implementation and makes such a transmitter profitable, while it resulted before too expensive and even it could not be proposed. The BW band occupied by the multicarrier signal, with a small margin in excess, is 10 MHz wide, allocated at the centre of a second Nyquist area, 17.3 MHz wide (FIG. 10), value that results from the assumption to have set at 34.6 MHz the frequency of the clock signal CK, indicated fs in the figures, compatibly with the speed that can be presently reached by the components used in the digital section.

The spectrum of the signal downstream the digital section (that is at the output of the digital/analogue converter) consists of the base band of the desired signal (first Nyquist area) constructed using the sum of the carriers generated by the numeric oscillators NCO1, NCO2, ..., NCON, and by its replicas repeated in any Nyquist area.

The signal base band (first replica) occupies the frequency interval 3.65 through 13.65 MHz, while the second replica occupies the frequencies between 20.95 and 30.95 MHz.

Since the second replica of the signal is used, the intermediate frequency results equal to 25.95 MHz (corresponding to the central value of the second Nyquist area), thus exploiting the conversion made by the DAC and avoiding by this the use of an appropriate mixer and local oscillator at intermediate frequency. The distance $\Delta F'$ between the lower edge of the BW band and the continuous results now 20.95 MHz, while the distance between the upper edge and the subsequent spectrum is 7.4 MHz.

Figure 10:
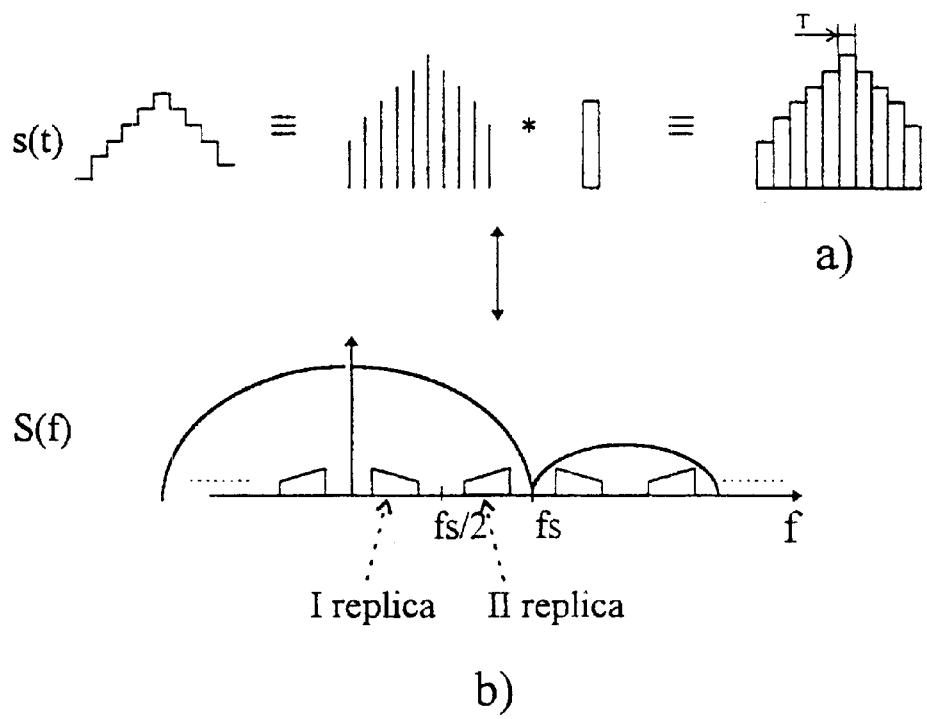

FIG. 10.$a$ shows the time course of the analogue signal s(t) coming out from the converter DAC. As it can be noticed, the duration of the analogue samples is T, where T=1/fs is the clock period CK, coinciding with the sampling interval of the multicarrier digital signal. The Fourier transform S(f) of a similar wave form is shown in FIG. 10.$b$, where it can be noticed that the corresponding spectrum is made of the base band spectrum and its replicas (containing the same information of the signal) specularly repeated every n.fs, being n an integer number that can assume positive and negative values. Furthermore the total voltage spectrum is enveloped by a function of the frequency f of the $\sin(\pi fT)/(\pi fT)$ type, whose nulls are in the frequencies n(1/T), that is at each multiple nfs of the sampling frequency.

In the case a second replica is used, the lower and upper band limits result 20.95 and 30.95 Mz respectively, and the first null falls at the frequency of fs=34.6 Mz. In this case the attenuation of the useful signal spectrum at the beginning and at the end of the spectrum have the following respective values:

$-20 \text{ Log } \sin(\pi 20.95/34.6)/(\pi 20.95/34.6) = 6.0 \text{ dB}$ $-20 \text{ Log } \sin(\pi 30.95/34.6)/(\pi 30.95/34.6) = 18.7 \text{ dB},$ showing an attenuation of 12 dB between the first and the last channel of the band of the multicarrier signal.

Figure 9:
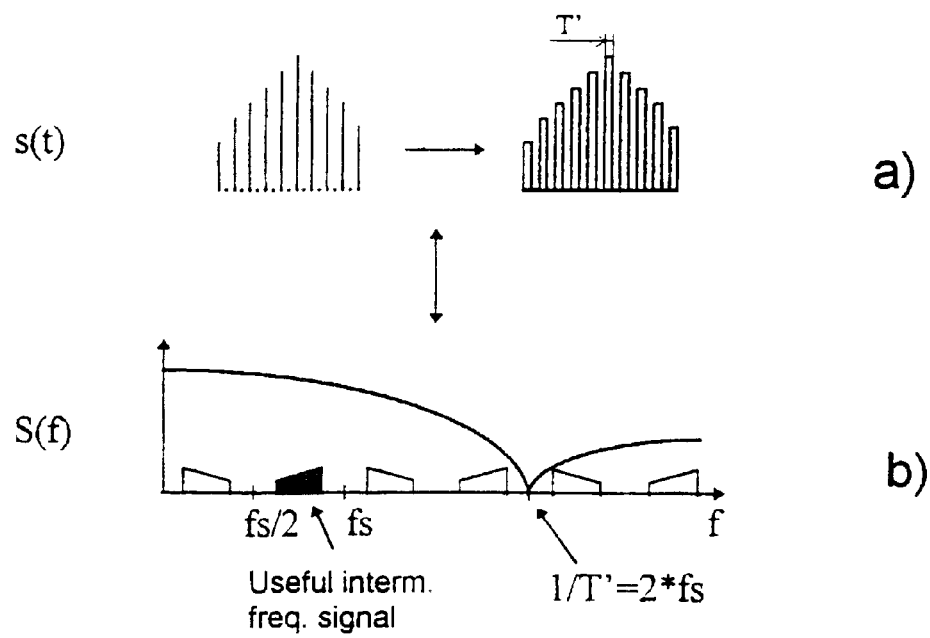
FIG. 9.a shows the time course of an analogue signal s(t) at the DAC output, to which the zero insertion equalization was applied.

FIG. 9.$a$ shows the time course of the analogue signal s(t) coming out from the DAC converter due to the insertion of null samples operated by the ZERIN block placed upstream. The duration of analogue samples is now T'=T/2, where T=1/fs is the period of the clock CK, coinciding with the sampling interval of the digital multicarrier signal. The Fourier transform S(f) of said signal is shown in FIG. 9.$b$, where it can be noticed that the total voltage spectrum is enveloped by a function of the frequency f of the $\sin(\pi fT')/(\pi fT')$ type, whose nulls are at the frequencies n(1/T'). Since in the example T'=1/2 fs, it results that the nulls fall at:

$$f\_null = n(1/T') = 2 \text{ nfs} \quad (9)$$

that is at each even multiple of the sampling frequency.

As it can be noticed in FIG. 9.b, interpolation made by the block ZERIN enabled to move away the nulls of the enveloping function that would have fallen at the nfs frequencies. This profitably allows using the second replica of the spectrum, which results attenuated by the same extent that the base band signal would have been attenuated (conventionally assumed as first replica) without interpolation.

The first null falls now at 2 fs=69.2 Mz frequency. In this case the attenuation of the spectrum of the useful signal at the beginning and at the end of the spectrum has the following respective value:

$-20 \text{ Log } \sin(\pi 20.95/69.2)/(\pi 20.95/69.2) = 1.36 \text{ dB}$ $-20 \text{ Log } \sin(\pi 30.95/69.2)/(\pi 30.95/69.2) = 3.08 \text{ dB},$ implying a difference in level of only 1.72 dB between the first and the last channel of the multicarrier signal.

Should the third replica be selected, in case of equalization with zero insertion, the attenuation at the beginning and at the end of the spectrum would have the following respective values:

$-20 \text{ Log } \sin(\pi 38.25/69.2)/(\pi 38.25/69.2) = 4.9 \text{ dB}$ $-20 \text{ Log } \sin(\pi 48,25/69.2)/(\pi 748.25/69.2) = 8.5 \text{ dB},$ the difference in level between the first and the last channel would be 3.6 dB and the average power of the signal would result approximately halved. These conclusions support the selection of the second replica.

The considerations made concerning the zero insertion apply verbatim also to the embodiment of FIG. 8.$d$, where the analogue component TG is an opportune transmission gate.

The band pass filter FRIC is a reconstruction filter of the multicarrier signal that selects from the spectrum of the signal coming out from the DAC the sole second spectral replica. As it can be noticed in FIG. 9.$b$, the selected spectrum has a course in frequency resulting specular around fs versus the base band spectrum. In the case of the example, the distance of the spectrum coming out from the filter FRIC of the continuous is:

$$\Delta F' = \frac{f_s}{2} + \frac{\left(\frac{f_s}{2} - BW\right)}{2} = 20,95 \text{ MHz} \quad (10)$$

This value involves a transition band destined to the radio frequency filtering, wide enough to enable the use of an image filter FIMM having less stringent characteristics compared to the case of direct use of the base band spectrum, where the distance from the continuous is of only 3.4 MHz. The use of an intermediate frequency, higher than that of the transmitter assumed in the introduction, enables also to satisfy the condition expressed in the (8) to avoid that the products of spurious conversion of the second rank (IMD2) could fall in the signal useful band. In fact it results:

$$f_{can1} = 20.95 \text{ MHz} > BW = 10 \text{ MHz}.$$

In the case of equalization with zero insertion, it is also possible to send the signal coming out from the reconstruction filter FRIC to a second emphasis network RENF that operates a softer equalization of the signal (that is, it shall recover the remaining 1.72 dB of attenuation between the first and the last channel).

The emphasis network can have transfer function with course EQ(f) of the type:

$$EQ(f) = C \frac{\pi fT'}{\sin(\pi fT')} \quad (11)$$

in the area of frequencies involved in the band of the signal IF (20.95÷30.95 MHz), or, more simply, since the difference in level between the first and the last channel of the useful spectrum is of a few dB, it is sufficient that it has linear course in the same frequency interval (this equalization can be also directly made by the reconstruction filter).

Figure 4:
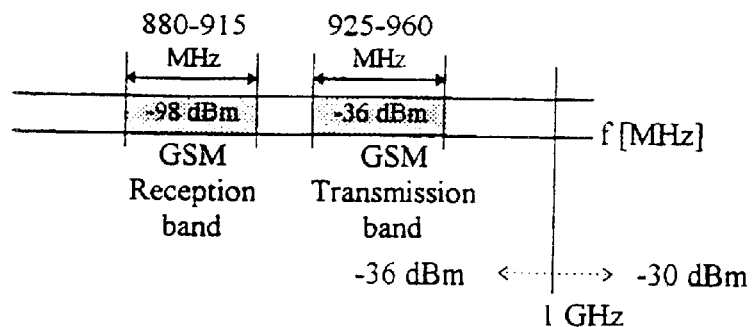
FIG. 4 shows a summary table of the GSM 11.21 specifications concerning the spurious emissions allowed at the output of a transmitter for GSM.
Figure 5:
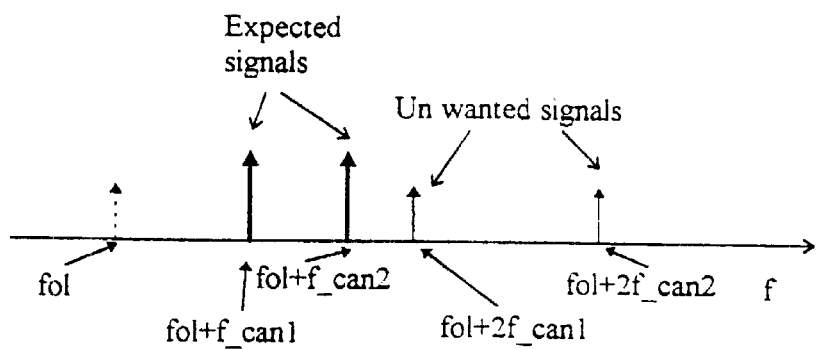
Figure 7:
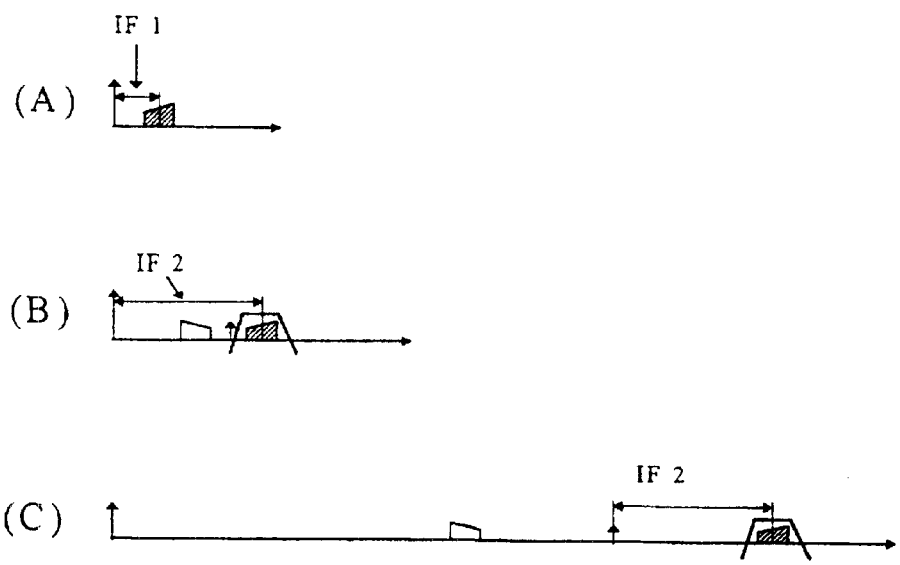
Figure 6:
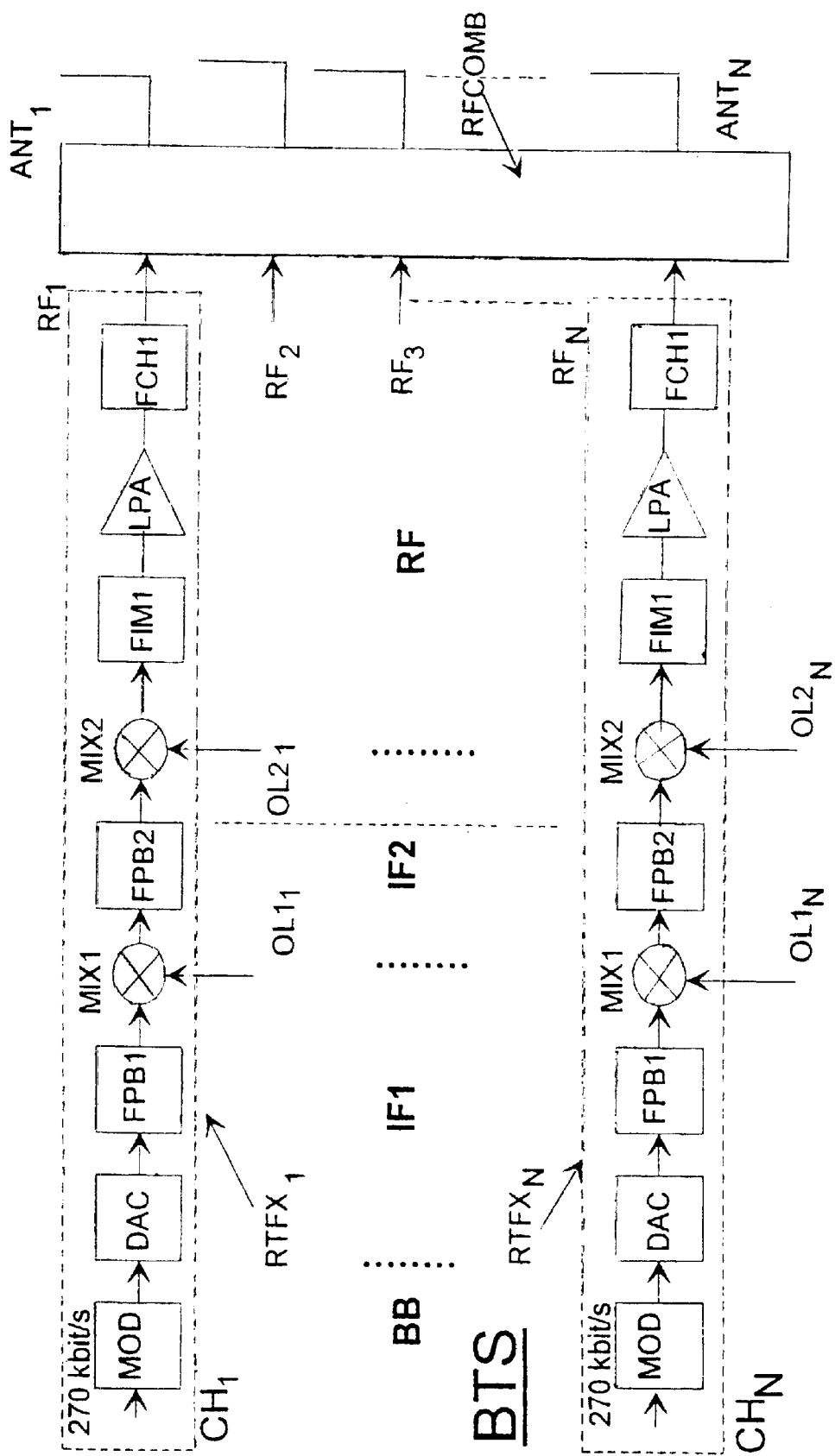
FIG. 6 is a block diagram of a generic multicarrier transmitter for GSM implemented according to the known art.

Once the signal is equalized and filtered, it reaches the mixer MIX. The frequency of the local oscillator signal OL is selected in order to position the spectrum coming out from the mixer within the desired transmission band, for instance the 925–960 MHz one, shown in FIG. 4, in case of GSM 900 MHz, or 1805–1880 MHz in case of DCS 1800 MHz. The mixer MIX acts as a suppressed carrier width modulator and, as it is known, it generates two side bands around the OL signal, the lower of which has an inverted course in frequency versus the spectrum before the conversion. The band pass filter FIMM selects the lower side band at the mixer output, so the second inversion of the base band spectrum made by the mixer, newly brings the radio frequency useful spectrum to the original condition. This last measure is profitable because in this way the residue of local oscillator and the undesired side band fall in areas of the spectrum where the specifications on the spurious emissions are more favourable, in the contrary instance said residues would fall in the reception band, rendering the specifications on radio frequency filters too stringent.

Concerning the implementation of the reconstruction filter FRIC used in the non restrictive example, it must be said before that the distance between replicas, irrespective of which of them has been selected, is always 7.4 MHz. The filter used is an 8-resonator, band pass filter with plane bandwidth of 10 MHz and 70 dB attenuation at the distance ΔF=7.4 MHz from the corner frequency.

The image filter FIMM is requested to attenuate the residue of local oscillator by 66 dB at the distance ΔF=20.95 MHz from the corner frequency and the undesired side band by 70 dB at the distance ΔF=41.9 MHz from the edge of the passband. Such an image filter can be implemented through the cascade of two identical band pass filters of the Chebyshev, 3-resonator type.

For comparison sake, the direct use of the base band multicarrier spectrum would have involved the realization of an 11-cell low-pass for the FRIC filter and of two band-pass filters of the Chebyshev type for the two filters forming the FIMM filter, both having 6 resonators, difficult to realize. As it can be noticed, the cost saving in the use of the second replica is important.

We shall now furtherly generalize some implementation aspects of the transmitter of the non-restrictive embodiment and its variants. In fact, it is possible, though less convenient, to use replicas of a rank higher than the second one. In this case, if one wants to make a zero insertion equalization, it is necessary to move the first null of the function enveloping the spectrum of the signal converted to analogue over 2 fs, value obtained including a sole null sample during the interpolation and that well fits the second replica, but that on the contrary could cause unacceptable attenuations between the two edges of the useful spectrum, when applied to upper rank replicas. In general, including k null samples during each sampling period T (with k=1, 2, . . . ), the duration of digital samples reduces to a value τ=T/(k+1)=1/(k+1)fs, and coinciding with the nulls of the enveloping function sin(πfτ)/(πfτ) turn to the frequencies: f_nulls=n/τ=n(k+1)fs.

The problem arising from the use of replicas higher than the second one is to find a suitable k value depending on the selected replica. Conventionally taking the base band spectrum as first replica, indicated by the value n=1, we noticed that to equalize sufficiently well the second replica, identified by n=2, it was sufficient to take k=1. By analogy with these conclusions, identifying with m the number of the replica one intends to use, it results that k=m−1 is the number of null samples per period T required for inclusion between subsequent samples, afterwards the duration τ of the samples and the position of the zeroes of the enveloping function remain automatically assigned. It results in fact: τ=T/m, and f-nulls=n/τ=nmfs. In general terms, once the n-th replica is selected, it should be also possible to insert a number of null samples k>m−1 between two subsequent samples of period T, reducing τ and farther widening the distances between the nulls of the envelope function, in this case we will have: τ<T/m, and f-null>nmfs. The modest advantage that would derive, consisting in the additional reduction of the already limited residual difference in level to equalise, of 1.72 dB only (notice that the maximum attenuation introduced by the enveloping function in the first Nyquist area is equal to 3.9 dB coinciding with fs/2) could be not completely justified by the increase of the clock frequency made necessary by such an opportunity. Reasoning in terms of frequency of the fip interpolated signal, we notice that the relation fip=2 fs of the non restrictive embodiment is subject to the following generalization: fip≧nfs in case of use of an n-th replica. In practice, it shall be convenient to locally generate the clock at fip frequency, in this case the divider block DIVCK shall divide fip by a divider≧n, coinciding with the selection of an n-th replica. The conclusions reached for the insertion of k null digital samples equally apply to the variant of FIG. 8.b, in which the analogue samples are reset for a time corresponding to the sum of the duration of the k null digital samples. In any case the intermediate frequency is placed at the centre of the selected n-th replica.

Therefore, though some embodiments of the present invention have been shown and described, it should be understood that the present invention is not limited thereto since other embodiments may be made by those skilled in the art without departing from the scope thereof. It is thus contemplated that the present invention encompasses any and all such embodiments covered by the following claims:

What is claimed is:

1. A process of implementing a multicarrier digital transmitter, comprising the steps of:
   a) digitally modulating at least one parameters of a plurality of single number carriers belonging to a multicarrier signal having a sampling frequency, obtained using data information conveyed by a plurality of sequences of transmission bits coming from a predetermined number of communication channels;
   b) summing numeric samples of said numeric carriers modulated as explained in step a), to obtain a sequence of samples at said sampling frequency of said multicarrier signal;
   c) converting to an analogue form of said sequence of samples to generate a sequence of analog samples;
   d) equalizing through an analogue filter of the function $$\frac{\sin(\pi fT)}{\pi fT}$$

that envelops the frequency spectrum of said sequence of analogue samples at an output of a digital to analog converter, T being the clock period of the digital to analog converter and f the independent variable frequency;
   e) band pass filtering to select an n-th replica at intermediate frequency of the base band spectrum of said multicarrier signal;

f) converting said replica selected at intermediate frequency to radio frequency;

g) band pass filtering for selecting a side band at radio frequency of the radio frequency converted signal, to amplify and couple to at least one transmitting antenna.

2. A process according to claim 1, wherein:

said step of equalizing is performed through an analogue filter with a transfer function of the $$\frac{\pi f \tau}{\sin(\pi f \tau)}$$

type in the band affected by the replica selected at intermediate frequency, placed in cascade to an amplifier block with gain selected in such a way to recover the attenuation introduced by the filter, τ being the clock period of the digital to analog converter.

3. A process according to claim 1, wherein it foresees also the step to perform an additional frequency shift operation through insertion of null samples between two subsequent period samples T of the digital signal.

4. A process according to claim 1, wherein said step of equalizing is made putting to value zero the samples converted to analogue for a time corresponding to the insertion of k null samples between two subsequent analogues samples, k being a constant affecting in a desired way the course of the width of the frequency spectrum of the sequence of analogue samples so interpolated.

5. A process according to claim 4, wherein the frequency spectrum of the sequence obtained putting to value zero the said samples converted to analogue has a width course of the $$\frac{\sin(\pi f \tau)}{\pi f \tau}$$

type where τ is the duration of pulses depending on said constant k.

6. A process according to claim 4, wherein it foresees also the step to perform an additional equalization operation made through an analogue filtering process.

7. A process according to claim 3, wherein said step of equalizing, made through an analogue filter, has linear course in frequency.

8. A process according to claim 1, wherein said n-th replica selected at immediate frequency is such that n is a even number, when the multicarrier base band spectrum is assumed as first replica, and said side band selected at radio frequency is the lower one.

9. A process according to claim 1, wherein said n-th replica selected is the second one.

10. A digital multicarrier transmitter, comprising:

digital modulation means of at least one parameters of a plurality of single numeric carriers belonging to a multicarrier signal having a sampling frequency, obtained using information conveyed by a plurality of sequences of transmission bits coming from a predetermined number of communication channels;

adding means of numeric samples of said numeric carriers modulated by said digital modulation means, controlled at said sampling frequency to obtain a sequence of samples of said multicarrier signals;

digital-to-analogue converter means for converting from digital to analog the sequence of samples to generate a sequence of analog samples;

equalizing means for equalizing said analogue samples based on a sinx/x function that envelops the frequency spectrum of said sequence of analogue samples;

first band pass filtering means for selecting an n-th replica at intermediate frequency of a base band spectrum of said multicarrier signal;

radio frequency conversion means for converting said replica selected at intermediate frequency to radio frequency;

second band pass filtering means for selecting a side band of the signal converted at radio frequency, to be sent to amplification means and to at least one transmitting antenna.

11. A transmitter according to claim 10, wherein said equalizing means consists of analogue resetting means.

12. A transmitter according to claim 11, wherein the analogue resetting means, are adapted to modify the course of the frequency spectrum of the sequence of analogue samples according to a function $$\frac{\sin(\pi f \tau)}{\pi f \tau}$$

where τ is the duration of pulses.

13. A transmitter according to claim 10, wherein said first band pass filtering means are adapted to select an n-th replica of the spectrum of the signal such that n is an even number and said second band pass filtering means are adapted to select a lower side band.

14. A transmitter according to claim 11, wherein first band pass filtering means are adapted to select a second replica, and the analogue resetting means are adapted to insert one sole null sample.

* * * * *